Dec. 25, 1928.
C. I. HALL
1,696,601
SYSTEM OF MOTOR CONTROL
Filed Sept. 13, 1926
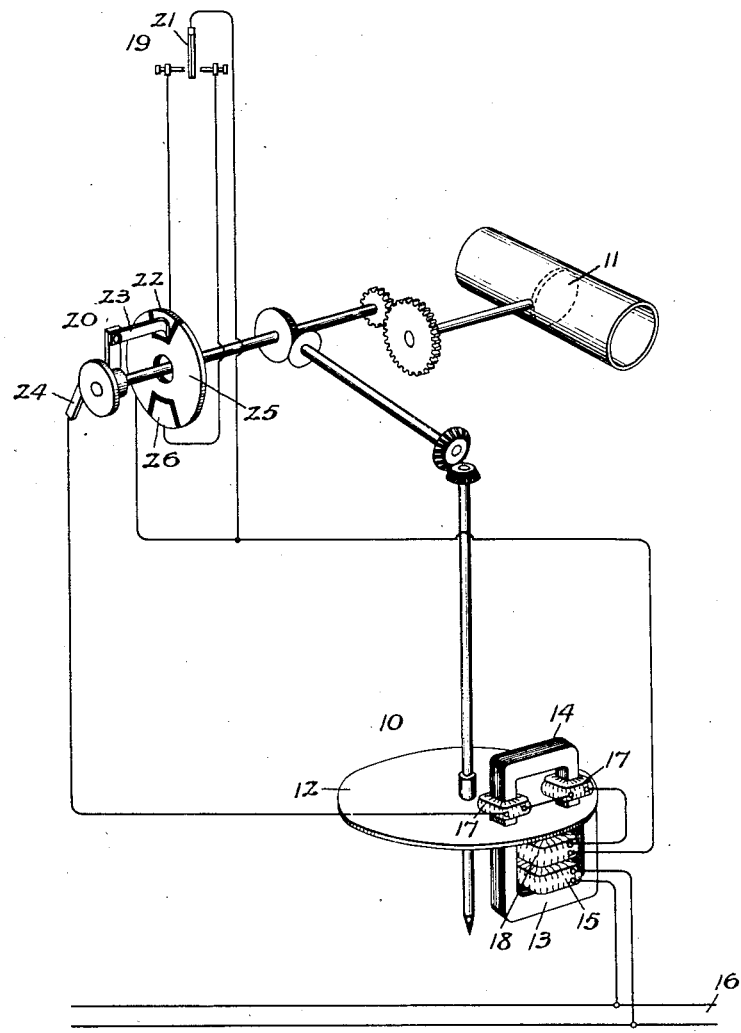
Inventor:
Chester I. Hall,
by Alexander S. Lunt.
His Attorney.

Patented Dec. 25, 1928.

1,696,601

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

SYSTEM OF MOTOR CONTROL.

Application filed September 13, 1926. Serial No. 134,993.

My invention is directed to improvements in systems of motor control, and in particular to a system whereby the electric motor serves as a regulator for a driven device such as a damper, valve or the like.

The invention has a particular application in regulators for dampers or valves in heating systems, particularly intended for use in homes, office buildings, or the like, for the purpose of automatically regulating the temperature within the building.

The present invention is an improvement over the system of motor control for which Alfred F. Welch obtained Letters Patent of the United States No. 1,518,619 dated December 9, 1924. As explained in the Welch patent, in operating a furnace regulator, for example, on a house lighting circuit of 110 volts, provision must be made whereby the regulation of the motor is effected through a relatively low voltage circuit. The underwriters have determined that this controlling circuit shall not be of a voltage greater than 10 to 12 volts. In the Welch system a repulsion type motor is used and while this type of motor is entirely operative and practical, nevertheless it leaves something to be desired because of the fact that the repulsion type of motor necessitates a commutator and brushes at which sparking may occur which may be dangerous under some conditions and which, furthermore, necessitates a periodical inspection of the brushes and commutator to insure entirely satisfactory operation. Another disadvantage of the Welch system is that the repulsion type of motor is relatively expensive to construct.

The principal objects of my invention are to provide a system of the general type proposed in the said Welch patent whereby an induction disc type of motor may be employed since this type of motor is relatively inexpensive and does not have a commutator. A further object of the invention is to provide a main or primary winding for the magnetic structure of the motor which may be permanently connected to the house lighting circuit and the motor is arranged to be started and stopped by controlling a local circuit including a polar winding and a second winding on the magnetic structure which is supplied with a relatively low voltage by the main or primary winding by transformer action.

In carrying my invention into effect, the polar winding and the second winding are arranged to be included in a local circuit by means of a thermostat and limit switch controlling means so that when the thermostat is operated to one of its limits in response to temperature change, the motor will be started by reason of the fluxes displaced in phase which are set up in the magnetic structure of the motor by the primary and polar windings. The induction disc armature thus operates the valve or other device to one of the limits at which the limit switch mechanism interrupts the local circuit in which the second winding is included.

For a better understanding of the invention, reference is had to the accompanying drawing in which the induction disc type motor 10 is arranged to operate the damper 11 of a heating system through the gearing between the rotating disc or armature 12 of the motor and the damper. The motor 10 is provided with a magnetic structure comprising the two parts 13 and 14. The part 13 is indicated as of E-shaped type having the main or primary winding 15 disposed on the middle leg thereof. This winding may be permanently connected to the relatively high voltage lighting circuit 16, as indicated. The part 13 of the magnetic structure is disposed to provide a plurality of poles adjacent the lower surface of the disc 12 and near the periphery thereof. The part 14 of the magnetic structure is disposed to provide a plurality of poles adjacent the upper surface of the disc 12 and in spaced alignment with the poles of the part 13 of the magnetic structure. This part 14 is provided with a polar winding 17 which has two parts connected in series, one part encircling each of the poles of the structure 14. This polar winding 17 is supplied with a relatively low voltage by the winding 18 on the magnetic structure 13 which acts as the secondary of a transformer, the winding 15 serving as the primary. The polar winding 17 is arranged to be included in a local circuit which is established and interrupted to effect the starting and stopping of the motor by the action of the controlling means including the thermostatic circuit controller 19 and the limit switch mechanism 20.

When the polar winding 17 is included in its local circuit, the flux set up by the primary winding 15 in the poles of the magnetic structure 13 and the flux set up by the polar winding 17 in the poles of the magnetic structure 14 will be out of phase and will induce currents in the disc 12 of non-magnetic conducting material such that a motor action is produced, as will be understood by those skilled in the art.

As thus constructed and arranged and with the parts in their responsive positions indicated in the drawing, the operation of my invention is as follows:—

The damper 11 is shown in its closed position and when the temperature in the room being heated by the heating system of which the damper 11 forms a part has dropped to a predetermined degree, the thermostat 21 will be flexed into engagement with its left-hand contact, thereby establishing a local circuit for the polar winding 17 of motor 10. This local circuit includes the thermostat 21, the stationary segment 22 of limit switch 20, rotatable contact 23 of the limit switch and the contact brush 24 of this limit switch. The rotation of the motor will be started and the damper 11 rotated from its vertical position toward its horizontal position. The brush 23 of the thermostat will be rotated correspondingly with the valve 11 so that after an initial limited rotation of this brush engagement will be broken with the stationary segment 22 and established through the stationary main part 25 of the limit switch. The local circuit for the polar winding 17 now includes the conducting part 25 of the limit switch, the rotating brush 23 and the stationary brush 24. It will be noticed that this circuit excludes the thermostat 21 so that control by the thermostat is temporarily excluded. When the brush 23 has been operated so as to move out of engagement with the part 25 of the limit switch and into engagement with the insulated segment 26 of this limit switch, the local circuit in which the winding 17 of the motor was included is now interrupted. The motor therefore stops and this will be at such a position that the damper 11 is now in its horizontal position. When the temperature in the room increases to the predetermined degree, the thermostat 21 will make engagement with its right-hand contact, thereby again establishing the local circuit for the polar winding 17 of the motor so as to effect a limited rotation of the motor. It will be noticed that this time the local circuit of the polar winding 17 is established through the limit switch segment 26. Operation will be the same as before and the rotation of the motor will be stopped when the brush 23 of the limit has been rotated to the position shown in the drawing. It will be observed that the thermostat is never called upon to break a circuit although it initially establishes the local circuit in which the polar winding 17 of the motor is included. By suitable design of the polar winding 17 and the magnetic structure of the motor, the current controlled by the thermostat and the limit switch may be relatively small and since this current is at a relatively low voltage, troubles due to sparking are obviated.

What I claim as new and desire to secure by Letters Patent of the United States, is:—

1. In combination, an electric induction motor having an induction disc armature, a magnetic field structure located on one side of said disc armature having a primary winding thereon connectible permanently to a relatively high voltage source of supply, a second winding on said field structure, a cooperating magnetic field structure located on the opposite side of said disc armature and having a polar winding thereon arranged to be included in a local circuit and supplied with current at relatively low voltage from said second winding by transformer action with said primary winding, the said primary and polar windings being provided for setting up fluxes in said cooperating magnetic field structures out of phase with each other which co-operate with said induction disc armature to effect rotation thereof, and controlling means for establishing and interrupting the local circuit for said polar winding to effect starting and stopping of said motor.

2. In a regulator, in combination, an electric induction motor having an induction disc armature, a magnetic field structure providing a plurality of poles adjacent one side of said induction disc armature and having a primary winding on one pole thereof connectible permanently to a relatively high voltage source of supply, a second winding on said one pole of the field structure, a cooperating magnetic field structure providing a plurality of poles on the opposite side of said induction disc armature in spaced alignment with the poles of said first magnetic structure and having a polar winding associated with the poles thereof arranged to be included in a local circuit with said second winding and supplied with current at relatively low voltage induced in said second winding by transformer action with said primary winding, the said primary and polar windings being provided for setting up fluxes out of phase with each other in the said plurality of poles in spaced alignment on opposite sides of said armature to effect rotation thereof, and automatic controlling means for temporarily including said polar winding in said local circuit to effect limited rotation of said armature.

3. In combination an alternating current electric motor comprising a rotatable disc of non-magnetic conducting material, an E-shaped magnetic structure having its poles disposed near the periphery of said disc on one side thereof, a primary winding located on the middle leg of said E-shaped magnetic structure and connectible permanently to a relatively high voltage source of supply for energizing said structure, a second winding located on the middle leg of said E-shaped magnetic structure, a U-shaped magnetic structure disposed on the opposite side of said disc with its poles in spaced alignment with the poles of said first structure and near the periphery of said disc, a polar winding on said U-shaped structure arranged to be supplied with a relatively low voltage from said second winding by transformer action with said primary winding, a thermostat for initially connecting said second winding in a local circuit with said polar winding, and a limit switch operated by said disc which establishes a maintaining circuit for energizing said polar winding from said second winding and interrupting the local circuit through said thermostat upon the initial movement of said disc and which interrupts the said maintaining circuit in which said second winding is included at a limit of operation of said disc.

In witness whereof, I have hereunto set my hand this 7 day of Sept., 1926.

CHESTER I. HALL.